US010944590B2

(12) United States Patent
Kumar et al.

(10) Patent No.: US 10,944,590 B2
(45) Date of Patent: *Mar. 9, 2021

(54) TRANSPORT PROTOCOL TASK OFFLOAD EMULATION TO DETECT CHUNKS OF DATA FOR COMMUNICATION WITH A PRIVATE NETWORK

(71) Applicant: NICIRA, INC., Palo Alto, CA (US)

(72) Inventors: Vasantha Kumar, Pune (MH); Amit Chopra, Pune (IN)

(73) Assignee: NICIRA, INC., Palo Alto, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/068,652

(22) Filed: Mar. 14, 2016

(65) Prior Publication Data

US 2017/0170986 A1 Jun. 15, 2017

(30) Foreign Application Priority Data

Dec. 10, 2015 (IN) ............................ 6611/CHE/2015

(51) Int. Cl.
*H04L 12/46* (2006.01)
*H04L 29/06* (2006.01)

(52) U.S. Cl.
CPC ...... *H04L 12/4633* (2013.01); *H04L 12/4641* (2013.01); *H04L 69/16* (2013.01)

(58) Field of Classification Search
CPC ......... H04L 67/10; H04L 43/04; H04L 63/20; H04L 29/06136; H04L 41/145; H04L 45/00; H04L 45/72; H04L 45/74; H04L 45/745; H04L 47/00; H04L 69/16; H04L 69/161; H04L 69/22; G06F 12/10; G06F 2212/657; G06F 21/00; H04W 12/08
See application file for complete search history.

(56) References Cited

U.S. PATENT DOCUMENTS

| | | | |
|---|---|---|---|
| 9,641,435 B1 * | 5/2017 | Sivaramakrishnan | ...................... H04L 45/745 |
| 2003/0061505 A1 * | 3/2003 | Sperry | .................... H04L 29/06 726/14 |
| 2009/0222906 A1 * | 9/2009 | Brandstatter | ....... H04L 63/0272 726/15 |
| 2011/0040968 A1 * | 2/2011 | Liu | ..................... H04L 12/4675 713/162 |
| 2014/0160928 A1 | 6/2014 | Racz et al. | |

(Continued)

*Primary Examiner* — Yemane Mesfin
*Assistant Examiner* — Mon Cheri S Davenport

(57) ABSTRACT

Example methods are provided for a first endpoint to communicate with a second endpoint over a public network, the second endpoint being in a private network. The method may comprise detecting a chunk of data directly from an application executing on the first endpoint. The virtual adapter may emulate a transport protocol task offload to bypass transport protocol processing by a protocol stack of the first endpoint. The method may comprise processing the chunk of data to generate a chunk of processed data for transfer through a tunnel connecting the virtual adapter over the public network with a gateway associated with the private network and sending the chunk of processed data through a tunnel in a plurality of tunnel segments, wherein the gateway is configured to perform transport protocol processing to generate a plurality of transport protocol segments from the chunk of processed data for transfer to the second endpoint.

21 Claims, 10 Drawing Sheets

(56) References Cited

U.S. PATENT DOCUMENTS

2016/0119288 A1 4/2016 Ardeli et al.
2016/0330076 A1* 11/2016 Tiwari ................ H04L 41/0806

* cited by examiner

TRANSPORT PROTOCOL TASK OFFLOAD EMULATION TO DETECT CHUNKS OF DATA FOR COMMUNICATION WITH A PRIVATE NETWORK

RELATED APPLICATIONS

Benefit is claimed under 35 U.S.C. 119(a)-(d) to Foreign application Serial No. 6611/CHE/2015 filed in India entitled "TRANSPORT PROTOCOL TASK OFFLOAD EMULATION TO DETECT CHUNKS OF DATA FOR COMMUNICATION WITH A PRIVATE NETWORK", on Dec. 10, 2015, by Nicira, Inc., which is herein incorporated in its entirety by reference for all purposes.

CROSS-REFERENCE TO RELATED APPLICATIONS

The present application is related in subject matter to U.S. patent application Ser. No. 15/068,667, which is incorporated herein by reference.

BACKGROUND

Unless otherwise indicated herein, the approaches described in this section are not admitted to be prior art by inclusion in this section.

A private network, such as a virtual private network (VPN), is a way to use a public network infrastructure (e.g., the Internet) to provide users at remote locations with secure access to their organization's network. A VPN is generally less expensive to run compared to a dedicated network owned or leased by the one organization. Although shared public network infrastructure is used, privacy may be maintained through security procedures and tunnelling protocols.

For example, using a tunnelling protocol, a remote user is able to access the private network from a remote location via a tunnel connecting the remote user to the private network. For example, any data sent from an application is segmented into Transmission Control Protocol (TCP) segments before they are sent through the tunnel. However, in practice, it may be inefficient to process and send a large number of TCP segments through the tunnel, which adversely affects application throughput and performance.

DETAILED DESCRIPTION

Figure 1:
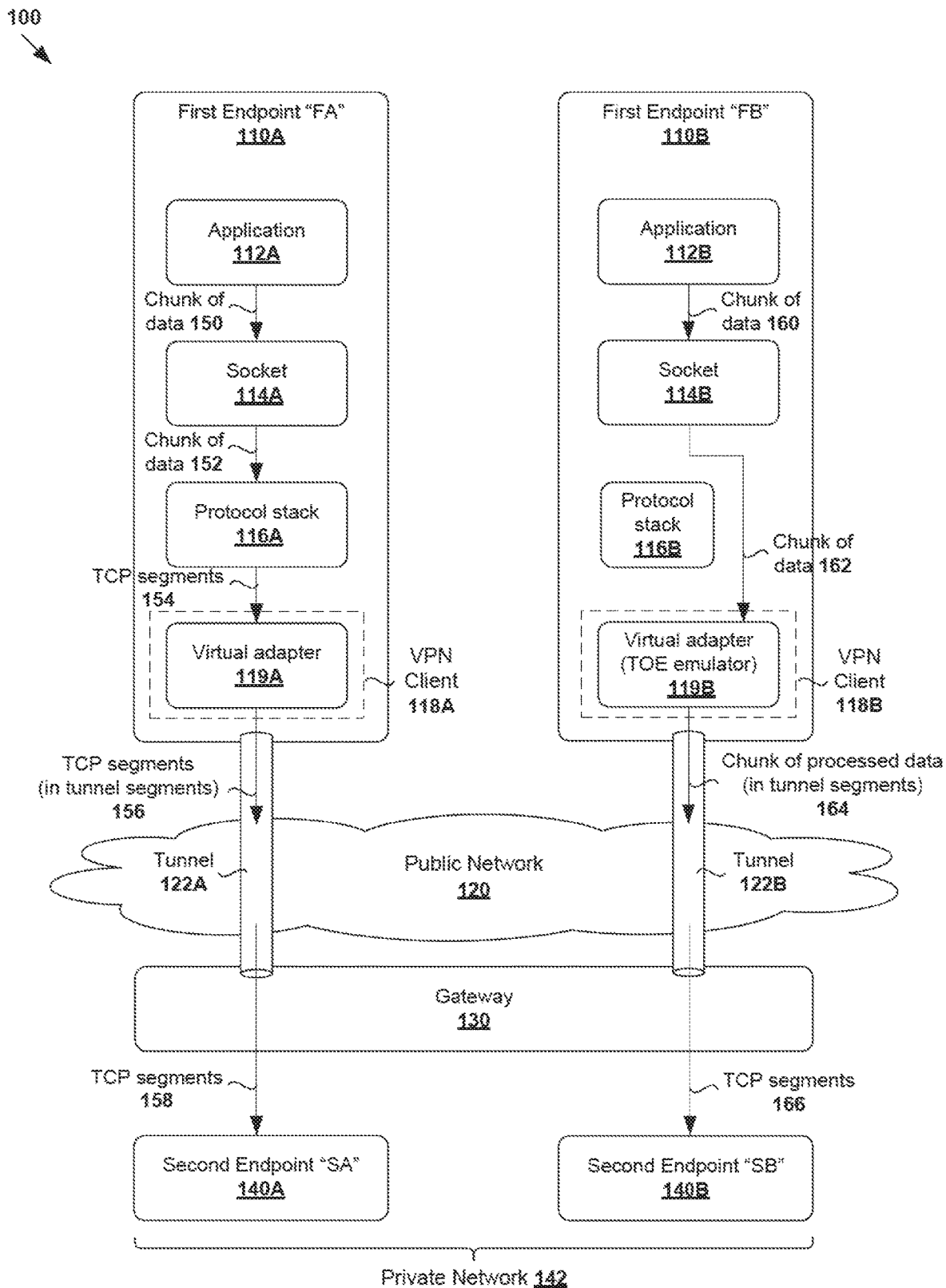
FIG. 1 is a schematic diagram illustrating an example network environment in which a first endpoint communicates with a second endpoint in a private network according to a first example.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges for remote users to communicate with a private network will be described in more detail with reference to FIG. 1, which is a schematic diagram illustrating example network environment 100 in which a first endpoint communicates with a second endpoint in a private network according to a first example. It should be understood that network environment 100 may include additional and/or alternative components than that shown, depending on the desired implementation.

In the example in FIG. 1, network environment 100 includes first endpoints (also known as "remote user devices," "remote clients" and "client computing devices"), such as "FA" 110A and "FB" 110B (i.e., "F" represents "First"). Network environment 100 further includes second endpoints in private network 142 with which the first endpoints communicate, such as "SA" 140A and "SB" 140B (i.e., "S" represents "Second"). In practice, FA 110A and FB 110B may be each operated by a user at a location remote to private network 142.

As will be described further below, FA 110A is shown in FIG. 1 to illustrate communication with SA 140A according to a conventional approach, and FB 110B to illustrate communication with SB 140B according to a first example of the present disclosure. It should be understood that both FA 110A and FB 110B are illustrated for comparison purposes. In practice, it is not necessary for network environment 100 to include FA 110A and for gateway 130 to support communication between FA 110A and SA 140A.

In the example in FIG. 1, FA 110A and FB 110B wish to communicate with respective SA 140A and SB 140B in private network 142. In practice, second endpoint 140A/140B may represent a physical server or a virtual machine supported by the physical server in private network 142. For example, second endpoint 140A/140B may provide various web-based services to first endpoint 110A/110B, such as to facilitate access to emails, files or applications on an organization's virtual private network (VPN) 142 by remote users (e.g., mobile workers, customers, business partners, etc.).

Gateway 130 associated with private network 142 may be any suitable interface unit to allow first endpoint 110A/110B to interface with private network 142 over public network 120 (e.g., the Internet). In practice, gateway 130 may be one or more physical or virtual machines to operate as a firewall, router, switch, load balancer or any combination thereof, etc. Tunnel 122A/122B is established between first endpoint 110A/110B and gateway 130 over public network 120 to facilitate communication with second endpoint 140A/140B.

Transport Layer Security (TLS) or Secure Sockets Layer (SSL) cryptographic protocol (either of which is herein referred to as "SSL" protocol) may be used for extended security, application control, reliability and ease of management. SSL protocol works over Transmission Control Protocol Internet Protocol (TCP/IP) as a network medium to transfer secure data to destinations 140A and 140B. In this case, tunnel 122A/122B represents an SSL tunnel and private network 142 represents a Secure Sockets Layer Virtual Private Network (SSL VPN). Data is transferred through tunnel 122A/122B in the form of "tunnel segments," which are encrypted to facilitate secure communication between first endpoint 110A/110B and second endpoint 140A/140B over public network 120. For example, security information for encryption and decryption (e.g., public key, private key, SSL certificate, etc.) may be exchanged when tunnel 122A/122B is established. Throughout the present disclosure, the term "tunnel segment" may generally represent a group of bits that are transported together through tunnel 122A/122B, such as an SSL tunnel segment.

First endpoint 110A/110B executes application 112A/112B (one shown for simplicity) having access to protocol stack 116A/116B via socket 114A/114B. Protocol stack 116A/116B is divided into several layers, such as transport layer (e.g., TCP layer), network layer (e.g., IP layer), etc. Socket 114A/114B serves as a protocol-independent interface for application 112A/112B to access protocol stack 116A/116B, such as by invoking socket system calls to open socket 114A/114B, sent data via socket 114A/114B, etc. To communicate with private network 142, private network client 118A/118B (e.g., "VPN client") is installed on first endpoint 110A/110B. VPN client 118A/118B implements virtual adapter 119A/119B to communicate with private network 142 through tunnel 122A/122B.

Throughout the present disclosure, the term "virtual adapter" (also known as "virtual network adapter") may refer generally to a network interface that is implemented by the execution of software instructions to simulate operations of a physical network adapter. In practice, VPN client 118A/118B may operate in a user mode and virtual adapter 119A/119B in a kernel mode. VPN client 118A/118B may use any suitable approach to control input/output operations of virtual adapter 119A/119B, such as Input Output Control (IOCTL), etc. After tunnel 122A/112B is established with gateway 130, virtual adapter 119A/119B may "tunnel" through to private network 142. In practice, socket 114A/114B, protocol stack 116A/116B and virtual adapter 119A/119B may be implemented by an operating system (not shown for simplicity) of first endpoint 110A/110B. Virtual adapter 119A/119B is assigned with an IP address to communicate with private network 142.

Conventionally, when a first endpoint such as FA 110A communicates with a second endpoint such as SA 140A, data from application 112A is segmented into TCP segments before they are sent through tunnel 122A. Referring to FIG. 1 again, application 112A sends data via socket 114A (see 150 and 152). Before data transfer may occur, protocol stack 116A performs transport protocol processing (e.g., TCP processing) to establish a TCP connection with SA 140A. Further, protocol stack 116A performs segmentation and checksum calculation to generate TCP segments (see 154).

Virtual adapter 118A then transfers the TCP segments in tunnel segments (see 156) through tunnel 122A to gateway 130. For example, the tunnel segments (see 156) may be SSL tunnel segments that are each generated by encapsulating a TCP segment (see 154) from protocol stack 116A with a VPN header, SSL header, outer TCP header, outer IP header, outer layer 2 header, etc. This is also known as the "TCP over TCP" approach where each SSL tunnel segment generally has an inner application-level TCP header as well as an outer tunnel-level TCP header. In practice, due to the connection-oriented nature of TCP; such "TCP over TCP" approach may be inefficient.

The size of the TCP segments (see 154) depends on a maximum transmission unit (MTU) supported by FA 110A, public network 120, private network 142 and SA 140A. For example, a typical MTU for TCP segments is 1500 bytes. Sending a large number TCP segments through protocol stack 116A and virtual adapter 119C is computationally expensive because it is necessary to allocate computational resources for each TCP segment. This leads to performance degradation, a problem that is compounded when there is a large amount of data that needs to be transferred. Further, SSL compression and SSL encryption are generally not as effective for smaller segments compared to larger ones.

To mitigate the above issues, one conventional approach is to use a local loopback to obtain larger chunks of data directly from the application. Another conventional approach is to hook socket system calls invoked by application 112A before the data reaches protocol stack 116A. However, these conventional approaches have limited success because they are usually not documented or not standardized. As a result, such conventional approaches are not always guaranteed to work for all applications and operating systems.

According to examples of the present disclosure, application throughput and performance may be improved using a virtual adapter to emulate a transport protocol task offload. For example, transport protocol TCP is connection-oriented, which adds to the complexity and processing overhead relating to the protocol. Transport protocol processing performed by the protocol stack usually includes connection establishment, segmentation, checksum calculation, connection termination, etc. Emulating the transport protocol task offload allows some or all of the transport protocol processing to be offloaded.

According to examples of the present disclosure, any suitable "transport protocol task offload" may be emulated by the virtual adapter, such as TCP offload engine (TOE), TCP segmentation offload (TSO), large receive offload (LRO), etc. Throughout the present disclosure, the term "emulate" or "emulation" may refer generally to software implementation (i.e., execution of software instructions) that simulates a transport protocol task offload. This should be contrasted with conventional TOE, TSO and LRO, which are conventionally designed for hardware implementation by a physical adapter, such as by an integrated chip embedded on a physical NIC.

Figure 3:
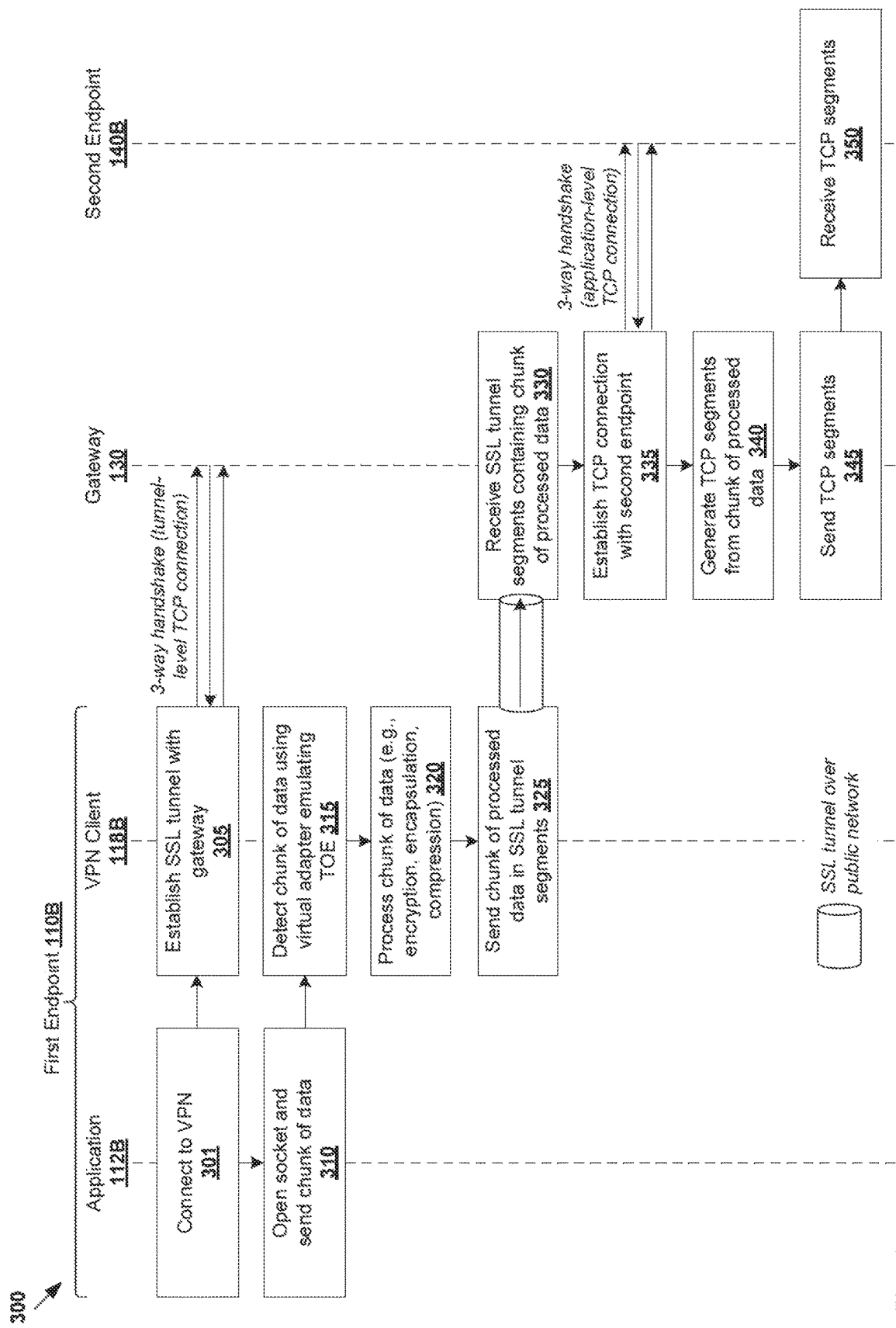
FIG. 3 is a flow diagram illustrating example communication in the network environment in FIG. 1 when the example process in FIG. 2 is implemented.
Figure 4:
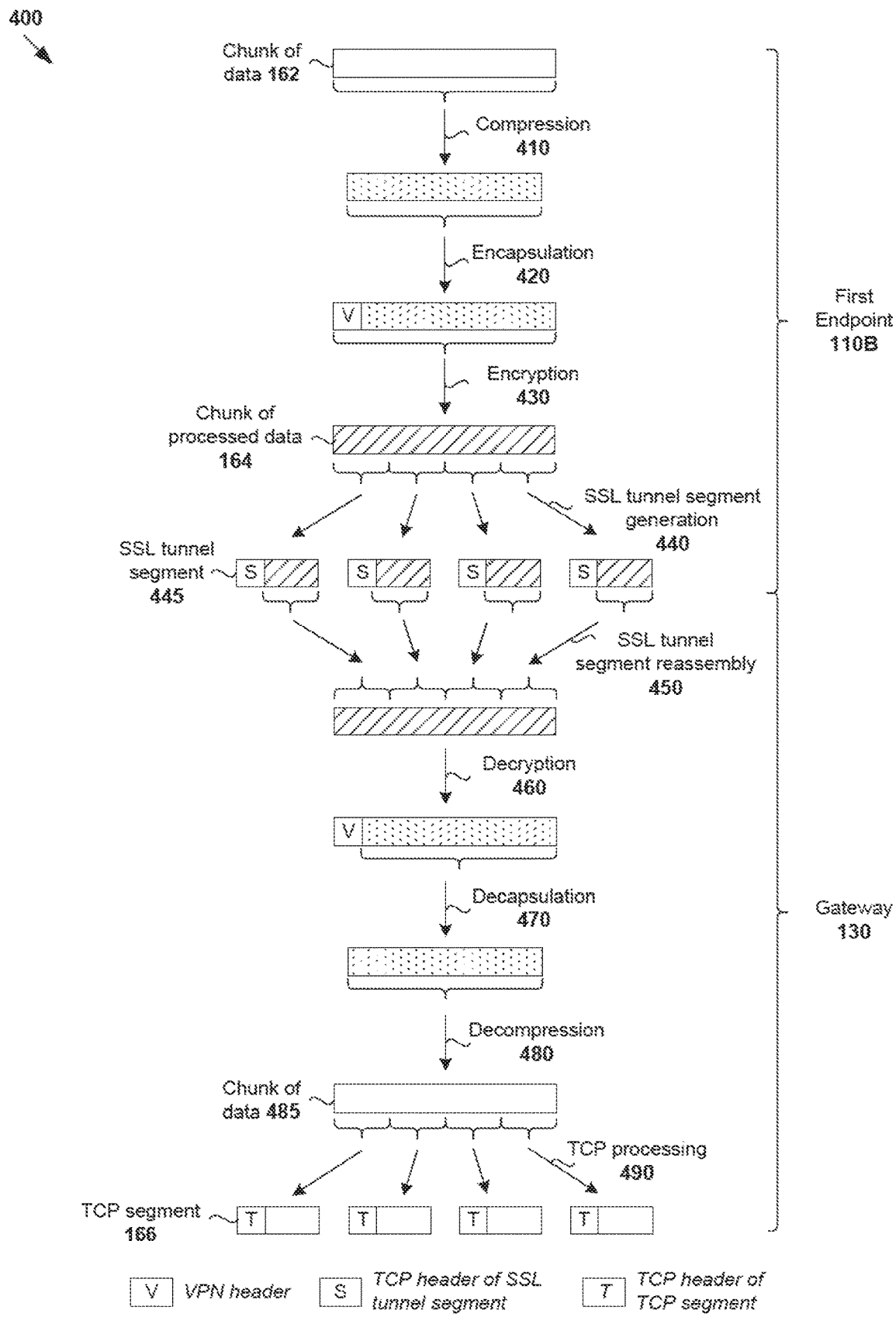
FIG. 4 is a schematic diagram illustrating example processing by a first endpoint and a gateway when the example process in FIG. 2 is implemented.
Figure 5:
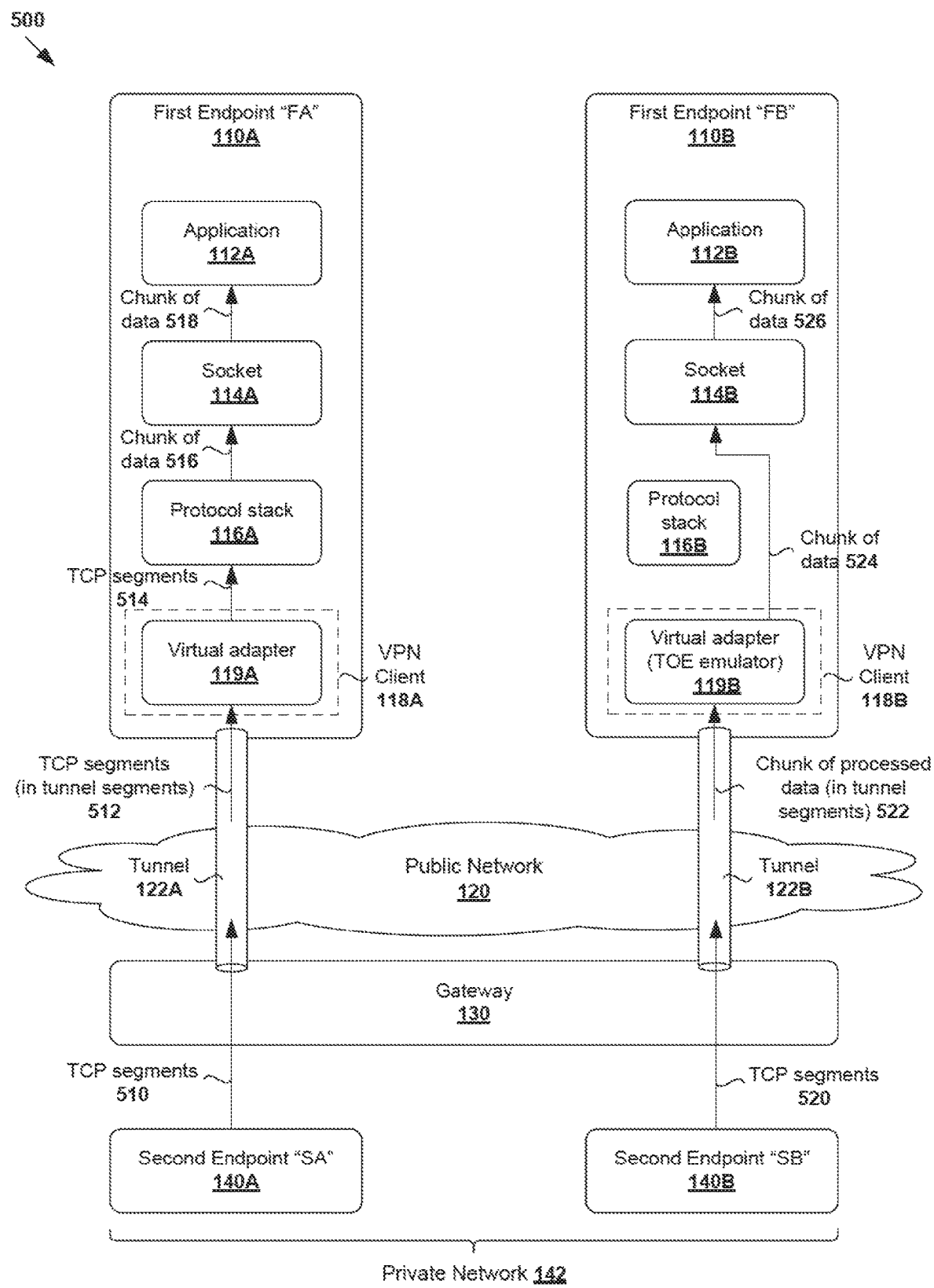
FIG. 5 is a schematic diagram illustrating an example network environment in which a first endpoint receives incoming data from a second endpoint in a private network according to a second example.
Figure 8:
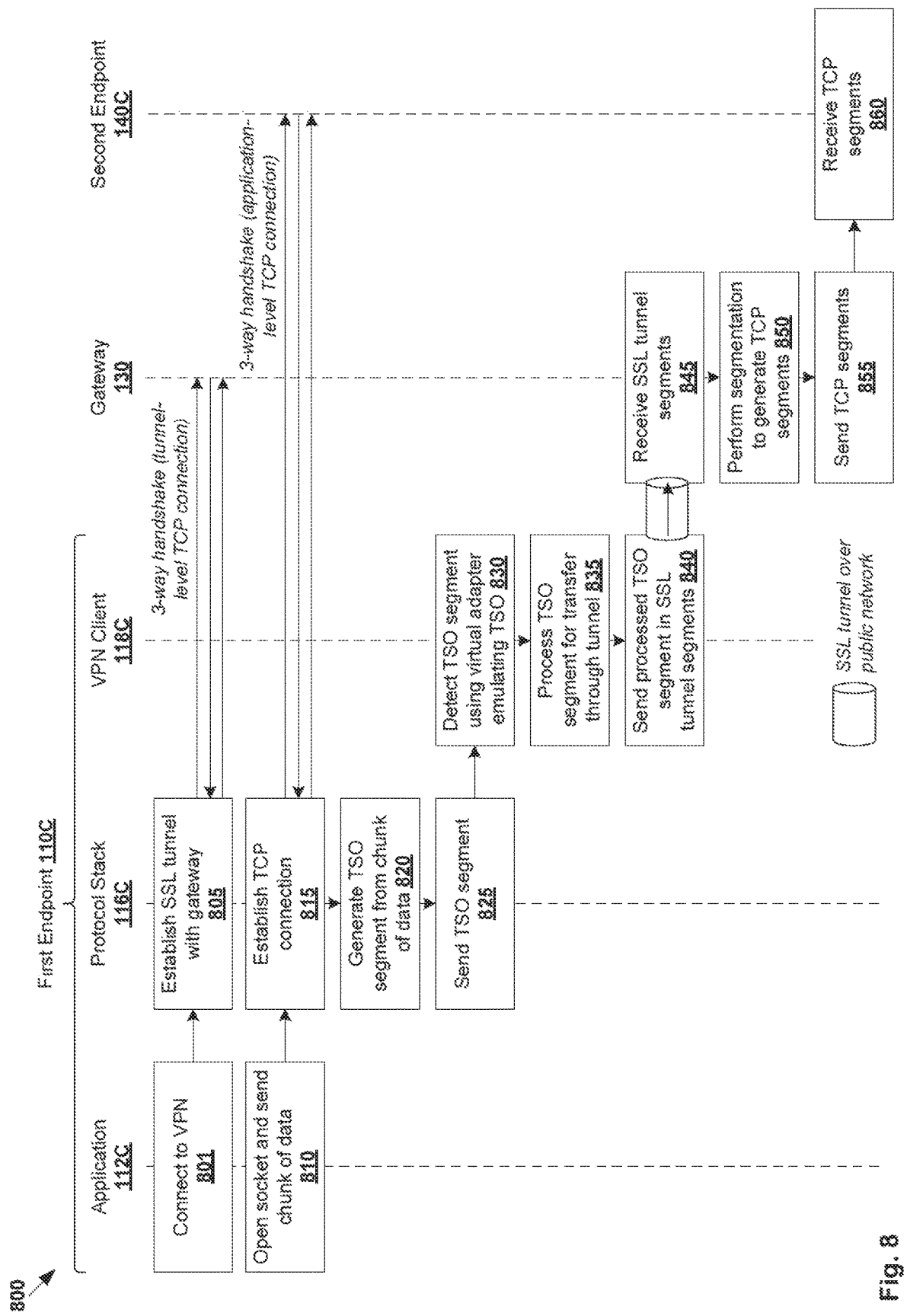
FIG. 8 is a flow diagram illustrating example communication in the network environment in FIG. 6 when the example process in FIG. 7 is implemented.
Figure 9:
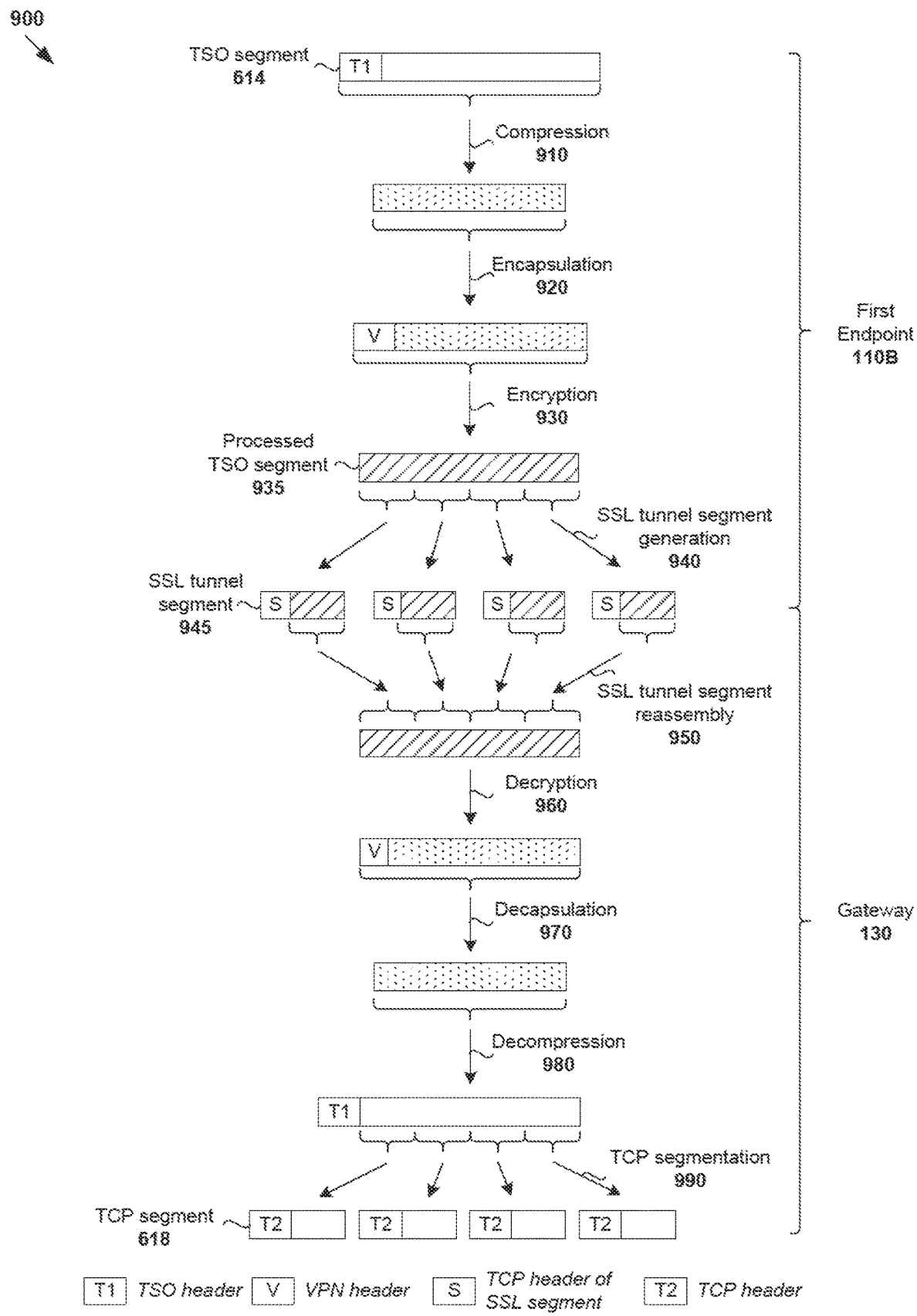
FIG. 9 is a schematic diagram illustrating example processing by a first endpoint and a gateway when the example process in FIG. 7 is implemented.
Figure 10:
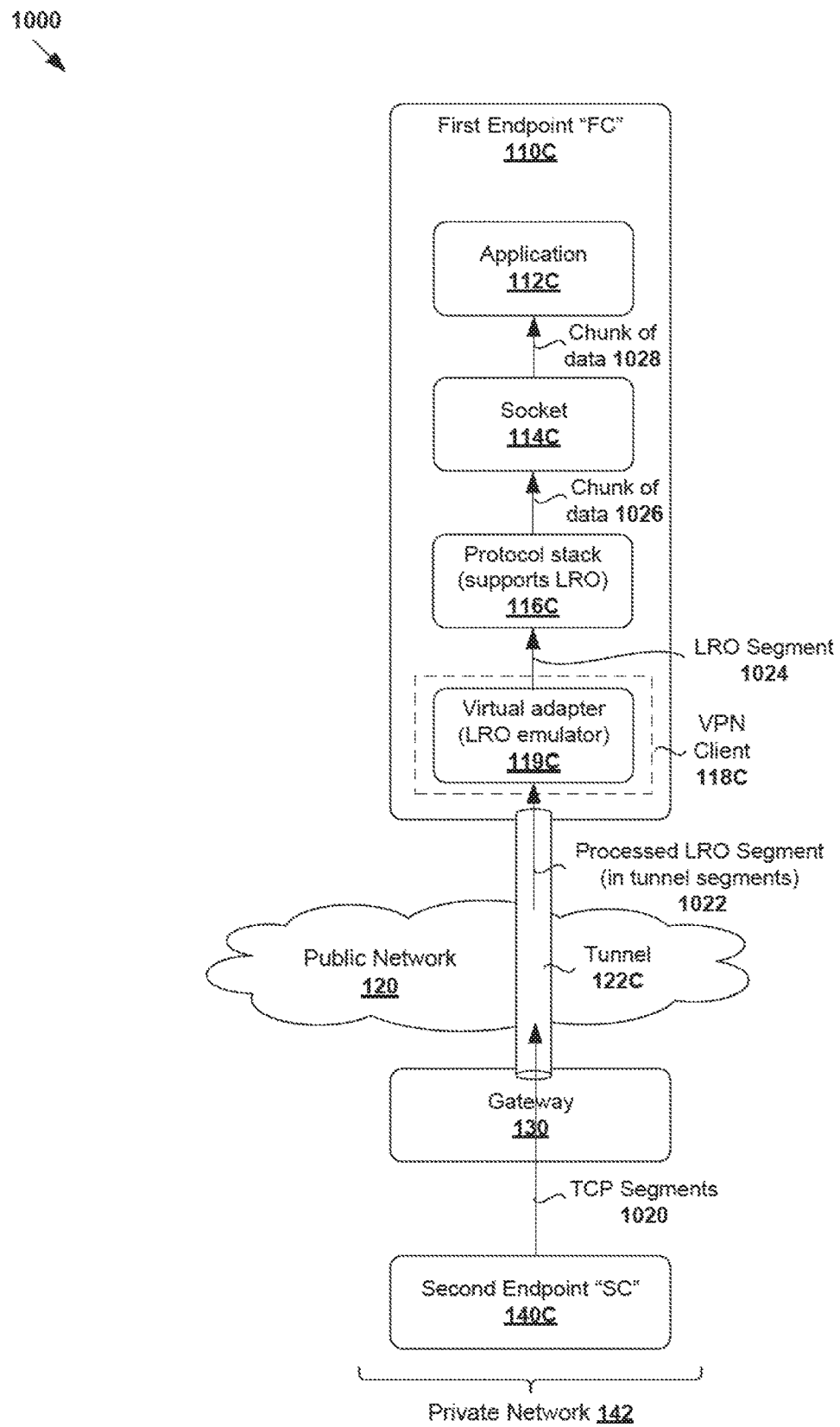
FIG. 10 is a schematic diagram illustrating an example network environment in which a first endpoint receives incoming data from a second endpoint in a private network according to a fourth example.

In the following, example TOE emulation for outgoing data will be described using FIG. 1 to FIG. 4; example TOE emulation for incoming data using FIG. 5; example TSO emulation for outgoing data using FIG. 6 to FIG. 9; and example LRO emulation for incoming data using FIG. 10. In the TOE emulation approach, a virtual adapter allows a protocol stack to be bypassed to offload all of its transport protocol processing (e.g., TCP processing) to gateway 130, such as connection establishment, segmentation, checksum calculation, connection termination, etc. In contrast, TSO emulation has more limited offload ability, such as to offload the task of segmentation to gateway 130. LRO emulation is similar to TSO emulation, but may be implemented to handle incoming data from private network 142.

Examples of the present disclosure facilitate transfer of larger chunks of data (compared to conventional TCP segments) to improve application throughput and performance. Further, instead of having to process a large number of smaller TCP segments, a virtual adapter may perform bulk processing (e.g., bulk compression and/or encryption) to improve efficiency. Throughout the present disclosure, the term "segments" may refer generally to a group of bits that can be transported together, and may be in another form, such as "frames", "messages", "packets", etc. Although TCP is used as an example "transport protocol," any other suitable transport protocol and corresponding task offloading approaches may be used. Further, although "tunnel segments" in the form of SSL tunnel segments are used in the following examples, any other suitable protocol may be used.

Example TOE Emulation for Outgoing Data

According to a first example of the present disclosure, a first endpoint (e.g., FB 110B in FIG. 1) may be configured to implement TOE emulation. In particular, compared to the conventional approach illustrated using FA 110A in FIG. 1, virtual adapter 119B may emulate TOE (i.e., an example "transport protocol task offload") to detect a chunk of data directly from application 112B, thereby bypassing TCP processing by protocol stack 116B.

Example TOE emulation will be explained with reference to FIG. 2, which is a flowchart of example process 200 for first endpoint 110B to communicate with second endpoint 140B in private network 142 according to a first example. Example process 200 may include one or more operations, functions, or actions illustrated by one or more blocks, such as 210 to 230. The various blocks may be combined into fewer blocks, divided into additional blocks, and/or eliminated depending on the desired implementation.

Figure 2:
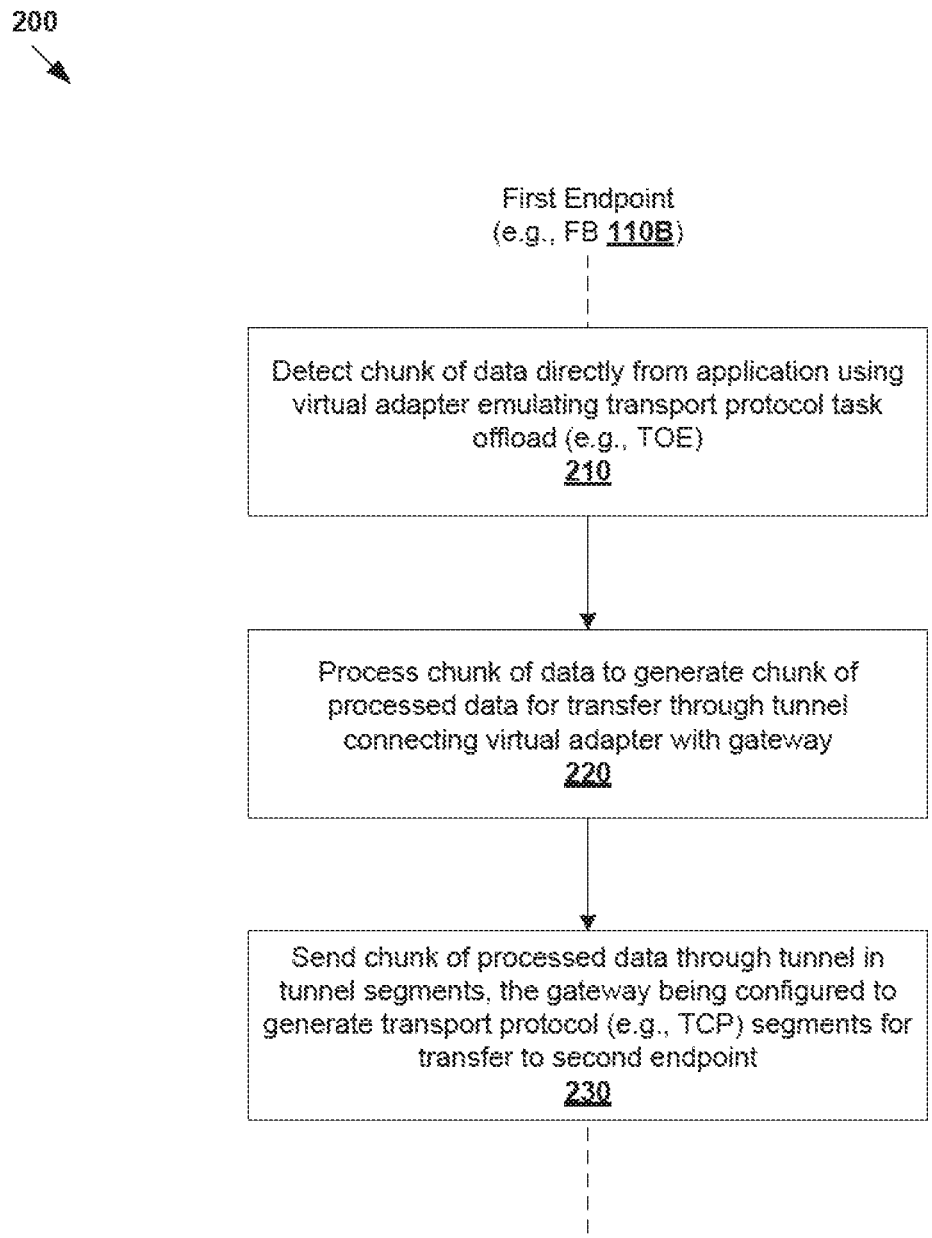
FIG. 2 is a flowchart of an example process for a first endpoint to communicate with a second endpoint in a private network according to a first example.

At 210 in FIG. 2, FB 110B detects a chunk of data (see 160 and 162 in FIG. 1) from application 112B executing on FB 110B. The chunk of data is destined for destination SB 140B in private network 142 and detected via virtual adapter 119B that emulates TOE to bypass transport protocol processing (e.g., TCP processing) by protocol stack 114B. Accordingly, as used herein, the term "chunk" may refer generally to a block of data that is sent by an application for transfer to a destination and has not been processed by a protocol stack (e.g., unsegmented, no checksum value, no TCP header, etc.). The chunk of data (e.g., 64 KB) is larger than the MTU of conventional TOP segments (e.g., 1500 bytes).

At 220 in FIG. 2, FB 110B (e.g., VPN client 118B) processes the chunk of data (see 160 and 162 in FIG. 1) to generate a chunk of processed data (see 164 in FIG. 1) for transfer through tunnel 122B. As explained using FIG. 1, tunnel 122B connects virtual adapter 119B over public network 120 with gateway 130 associated with private network 142.

Any suitable processing may be performed at 220, such as compression, VPN header encapsulation, encryption, or any combination thereof, etc. Here, the term "processed" may refer generally to compressed, encapsulated, encrypted, or any combination thereof, etc. Instead of having to process individual TOP segments, bulk processing may be performed on the chunk of data to improve efficiency. For example, compression of a larger chunk of unsegmented data may be performed more effectively compared to that of smaller TCP segments.

At 230 in FIG. 2, FB 110B sends the chunk of processed data (see 164 in FIG. 1) in a plurality of tunnel segments through tunnel 122B. Gateway 130 is configured to generate TCP segments (see 166 in FIG. 1) from the chunk of processed data for transfer to destination SB 140B. In practice, an underlying tunnel protocol stack (e.g., SSL protocol stack; not shown for simplicity) may generate the tunnel segments from the chunk of processed data.

More detailed examples will be explained with reference to FIG. 3 and FIG. 4. In particular, FIG. 3 is a flow diagram illustrating example communication 300 in network environment 100 in FIG. 1 when example process 200 in FIG. 2 is implemented. The example in FIG. 3 is illustrated using one or more operations, functions, or actions, such as 301 to 350 in FIG. 3. The various operations, functions, or actions may be combined, divided, and/or eliminated based upon the desired implementation. FIG. 4 is a schematic diagram illustrating example processing 400 by first endpoint 110B and gateway 130 when example process 200 in FIG. 2 is implemented.

At 301 and 305 in FIG. 3, in response to application 112B connecting to private network 142, VPN client 118B establishes tunnel 122B (e.g., SSL tunnel) with gateway 130 to facilitate communication between FB 110B and a destination in private network 142 such as SB 140B. Any suitable approach may be used at 305, such as establishing a tunnel-level TCP connection for tunnel 122B. The tunnel-level TCP connection may be identified using a connection identifier (ID) and subsequently used by FB 110B to communicate with private network 142.

For example, VPN client 118B may initiate the connection establishment process by sending a synchronization (SYN) packet to gateway 130, which then responds with a synchronization-acknowledgment (SYN-ACK) packet. VPN client 118B then responds with an ACK packet to conclude the connection establishment process. Although one application 112B is shown as an example, it should be understood that multiple applications executing on FB 110B may share the same tunnel-level TCP connection with gateway 130.

At 310 in FIG. 3, application 112B opens socket 114B to send a chunk of data (see 160 and 162 in FIG. 1) for transfer to destination SB 140B in private network 142. Socket 114B serves as a protocol-independent interface for application 112B, and the chunk of data (see 160 in FIG. 1) includes unsegmented data that has not been processed (e.g., TCP processing) by protocol stack 116B.

At 315 in FIG. 3 (related to 210 in FIG. 2), VPN client 118B detects the chunk of data (see 160 and 162 in FIG. 1) directly from application 112G using virtual adapter 119B emulating TOE, thereby bypassing transport protocol processing by protocol stack 116B. For example, transport protocol processing that is usually performed by protocol stack 116B may include connection establishment, segmentation, checksum calculation, connection termination, etc.

At 320 in FIG. 3 (related to 220 in FIG. 2), VPN client 118B processes the chunk of data (see 160 and 162 in FIG.

1) for transfer through tunnel 122B. As shown in FIG. 1, tunnel 122B connects virtual adapter 119B through public network 120 with gateway device 130.

At 325 in FIG. 3 (related to 230 in FIG. 2), the chunk of processed data (see 164 in FIG. 1) is sent via virtual adapter 119B through tunnel 122B to gateway 130. The chunk of processed data is sent in SSL tunnel segments (see 164 in FIG. 1). This causes gateway 130 to generate TCP segments (see 166) for transfer to SB 140B according to 330 to 345 in FIG. 3 below.

Referring also to FIG. 4, the chunk of data (see 162 in FIG. 4) detected directly from application 112O may be processed (e.g., by VPN client 118B) using any suitable approach. For example, the chunk of data (see 162 in FIG. 4) may be compressed (see 410 in FIG. 4), encapsulated with a VPN header associated with private network 142 (see 420 and header labelled "V" in FIG. 4) and encrypted (see 430 in FIG. 4) to generate a chunk of processed data (see 164 in FIG. 4). The VPN header may identify the destination IP address and destination port number associated with SB 140B.

The chunk of processed data (see 164 in FIG. 4) is then sent to through tunnel 122B to gateway 130 in SSL tunnel segments (see 445 in FIG. 4). In practice, the chunk of processed data may be encapsulated with a SSL header before it is segmented into multiple SSL tunnel segments (see 440 in FIG. 4). Each tunnel segment is encapsulated with a tunnel-level TCP header (labelled "S" in FIG. 4) identifying the destination IP address and destination port number associated with gateway 130.

In practice, FB 110B (e.g., VPN client 118B) may implement a compression unit to perform SSL compression with the aim of reducing the amount of data sent through tunnel 122B for improved throughput and efficiency. An encapsulation unit may be implemented to perform VPN header encapsulation. An encryption unit may be implemented to perform SSL encryption to support secure communication through tunnel 122B. Generation of SSL tunnel segments (see 440 in FIG. 4) may be performed by an SSL protocol stack (not shown for simplicity) implemented by FB 110B.

Referring to FIG. 3 again, at 330, gateway 130 receives the SSL tunnel segments containing the chunk of processed data (see 164 in FIG. 1) through tunnel 122B from virtual adapter 119B. At 335 in FIG. 3, in response to receiving the SSL tunnel segments, gateway 130 performs transport protocol processing to establish an application-level TCP connection with SB 140B, such as using a three-way handshake process. For example, gateway 130 initiates the connection establishment process by sending a synchronization (SYN) packet to SB 140B, which then responds with a synchronization-acknowledgment (SYN-ACK) packet. Gateway 130 then responds with an ACK packet to conclude the connection establishment process.

At 340 in FIG. 3, gateway 130 performs transport protocol processing to generate TCP segments (see 166 in FIG. 1) from the chunk of processed data (see 164 in FIG. 1). At 345 in FIG. 3, gateway 130 sends the TCP segments (see 166 in FIG. 1) to SB 140B via the TCP connection established at 335 in FIG. 3. It should be understood that the TOP connection establishment process may only be performed once during the data transfer, and further TCP segments may be sent to SB 140B via the same TCP connection.

Referring to FIG. 4 again, the generation of the TCP segments at 340 in FIG. 3 may involve reversing the processing by FB 110B at 320 in FIG. 3. For example, gateway 130 may reassemble the SSL tunnel segments (see 445 and 450 in FIG. 4). If the chunk of processed data is encrypted by virtual adapter 119B, gateway 130 may perform decryption (see 460 in FIG. 4) using security information (e.g., public key, private key) exchanged when tunnel 122B is established. Gateway 130 may then perform decapsulation to remove the VPN header (see 470 in FIG. 4) and decompression (see 480 in FIG. 4) to obtain the chunk of data sent by application 112B (see 485 in FIG. 4). From a connection ID in the VPN header, gateway 130 may learn that the chunk of data is destined for SB 140B.

Gateway 130 then performs TCP processing (see 490 in FIG. 4) to generate multiple TCP segments (see 166) containing the chunk of data (see 485 again). For example, as part of TCP processing, a chunk of data may be segmented into multiple TCP segments, each having a TCP header and a payload. In the case of a chunk of data with size=64 KB (i.e., 65,536 bytes), header size=40 bytes and maximum payload size=1,460 bytes, segmentation results in a total of 45 TCP segments (i.e., 65,536/1,460=44.89 segments). The TCP header (labelled "T" in FIG. 4) of each TCP segment identifies the destination IP address and destination port number associated with SB 140B.

At 350 in FIG. 3, SB 140B receives the TCP segments (see 166 in FIG. 1 and FIG. 4) generated and sent by gateway 130. Although not shown in FIG. 1 and FIG. 3, SB 140B may include a protocol stack to reassemble the TCP segments into the chunk of data sent by application 112B of the sender (i.e., FB 110B).

Example TOE Emulation for Incoming Data

The examples in FIG. 1 to FIG. 4 may also be applied to incoming data (also known as "inbound" or "ingress" data) sent by second endpoint SB 140B for transfer to first endpoint FB 110B. In more detail, FIG. 5 is a schematic diagram illustrating example network environment 500 in which first endpoint 110B receives incoming data from second endpoint 140B in private network 142 according to a second example. It should be understood that network environment 500 may include additional and/or alternative components than that shown, depending on the desired implementation.

Similar to the example in FIG. 1, first endpoints FA 110A and FB 110B are shown side by side for comparison purposes. In practice, it is not necessary for network environment 500 to include FA 110A and for gateway 130 to support communication with SA 140A. Conventionally, TCP segments (see 510) from SA 140A are sent by gateway 130 to virtual adapter 119A in the form of SSL tunnel segments (see 512) through tunnel 122A. The TCP segments (see 514) are then generated from the SSL tunnel segments and sent to protocol stack 116A for further processing.

As such, the conventional approach places a lot of processing burden on protocol stack 116A of FA 110A to receive and reassemble the TCP segments (see 514) into a chunk of data (see 516 and 518) that can be handled by application 112A. This is especially evident when a large amount of data is transferred from SA 140A to FA 110A, in which case gateway 130, virtual adapter 119A and protocol stack 116A are required to process a large number of TCP segments.

According to examples of the present disclosure, virtual adapter 119B supported by FB 110B may implement TOE emulation to improve application throughput and performance compared to the conventional approach implemented by FA 110A. In this case, gateway 130 may be configured to generate a chunk of processed data from the TCP segments (see 520 in FIG. 5) sent by SB 140B. Gateway 130 then sends the chunk of processed data in SSL tunnel segments (see 522 in FIG. 5) through tunnel 122B to virtual adapter 119A. Here, the term "processed" in "chunk of processed data" may refer generally to compressed, encapsulated with a VPN header, encrypted, or any combination thereof, etc.

At FB 110B, a SSL protocol stack (not shown for simplicity) may be used to reassemble the SSL tunnel segments (see 522 in FIG. 5) into a chunk of processed data. Virtual adapter 119B may emulate TOE to receive the chunk of processed data (see 522 in FIG. 5), instead of conventional TCP segments. VPN client 118B may then generate a chunk of data (see 524 in FIG. 5) from the chunk of processed data (see 522 in FIG. 5). For example, VPN client 118B may implement a decryption unit to perform decryption, a decapsulation unit to remove a VPN header, a decompression unit to perform decompression, or any combination thereof, etc.

Virtual adapter 119B then sends the chunk of data (see 524 in FIG. 5) directly to application 112B via socket 114, thereby bypassing transport protocol processing by protocol stack 116B. As such, similar to the example in FIG. 1, transport protocol processing (e.g., TCP processing) that is usually performed by protocol stack 116B may be offloaded to gateway 130. The reverse of example processing 400 in FIG. 4 also may also be applied for handling incoming data from SC 140C.

In practice, any suitable TOE emulation approach may be used by FB 110B, such as TCP chimney offload, etc. For example, Windows operating system supports a Network Driver Interface Specification (NDIS) 6.0 virtual adapter that may be configured to collect direct socket data from application 112B. This allows the TCP/IP stack to be skipped entirely. In practice, virtual adapter 119B may be configured to emulate TOE by installing one or more drivers on FB 110B according to any suitable TOE specification. Once the data transfer completes, connection termination may be initiated by gateway 130 or SB 140B, such as by sending a finish (FIN) packet.

Example TSO Emulation for Outgoing Data

According to the above examples, a virtual adapter that emulates TOE allows the entire transport protocol processing (e.g., TCP processing) to be offloaded from a protocol stack to gateway 130. In practice, however, it may be desirable to offload a particular operation or task of the transport protocol processing, such as segmentation, etc. In this case, instead of bypassing the protocol stack completely, the protocol stack performs some TCP processing (e.g., connection establishment with the destination, adding a TOP header, etc.).

Further, instead of detecting a chunk of data directly from an application, the virtual adapter detects "offload segments" generated by the protocol stack from a chunk of data from the application. In the case of segmentation offload, the virtual adapter emulates TSO to detect an offload segment in the form of TSO segment that is larger than a conventional TCP segment.

Figure 6:
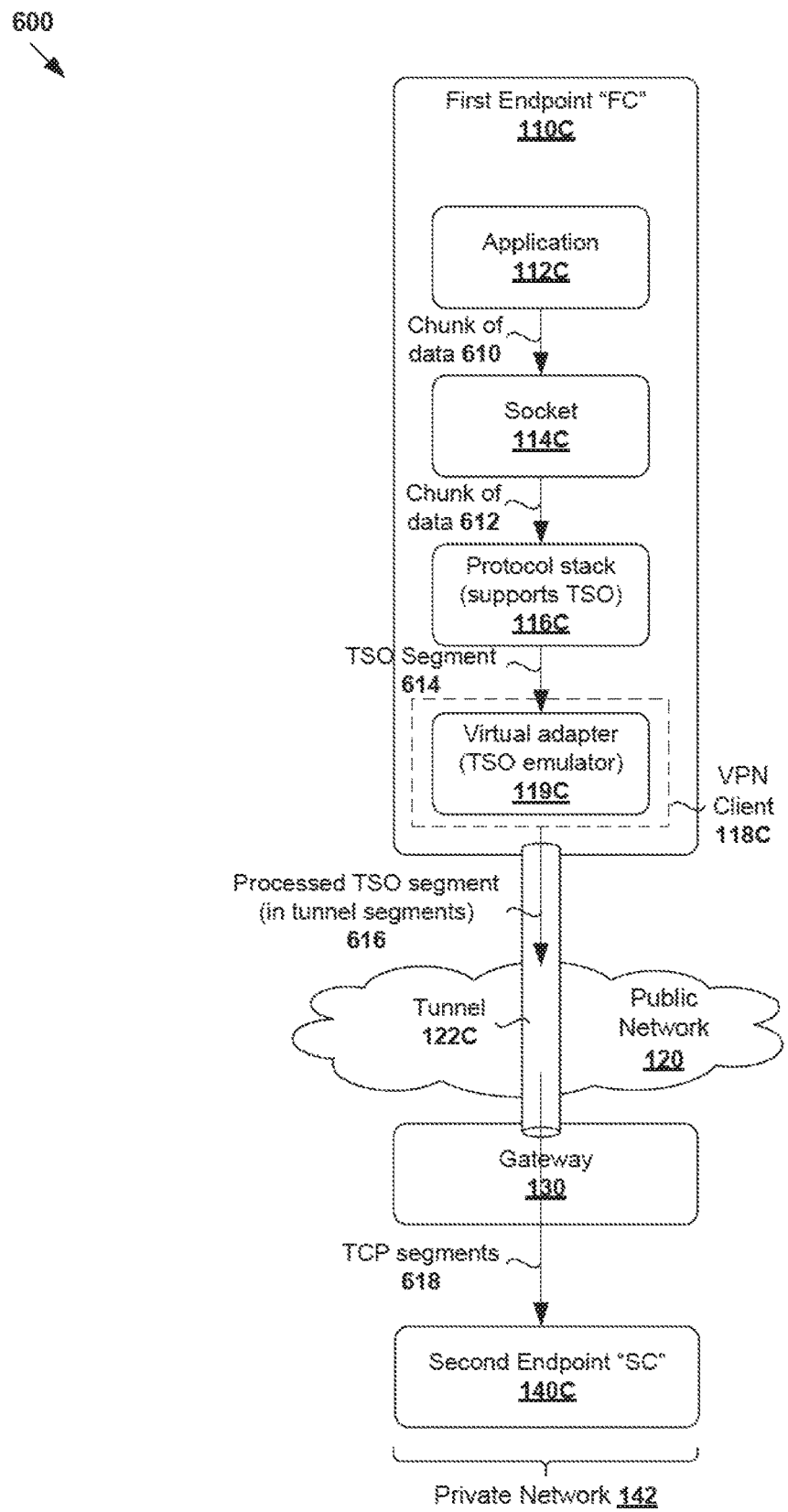
FIG. 6 is a schematic diagram illustrating an example network environment in which a first endpoint communicates with a second endpoint in a private network according to a third example.

In more detail, FIG. 6 is a schematic diagram illustrating example network environment 600 in which first endpoint 1100 communicates with second endpoint 140C in private network 142 according to a third example. It should be understood that network environment 600 may include additional and/or alternative components than that shown, depending on the desired implementation. In more detail, network environment 600 includes a first endpoint (e.g., "FC" 110C) that communicates with a second endpoint (e.g., "SC" 140C) in private network 142 over public network 120.

FC 110C executes application 112C having access to protocol stack 116C via socket 114C. Protocol stack 116C is divided into several layers, such as transport layer (e.g., TCP layer), network layer (e.g., IP layer), etc. Socket 114C serves as a protocol-independent interface for application 112C to access protocol stack 116C, such as by invoking socket system calls to open and send data via socket 114C. To communicate with private network 142, private network client 118C (e.g., VPN client) installed on FC 110C implements virtual adapter 119C to communicate with private network 142 through tunnel 122C (e.g., SSL tunnel) that is established over public network 120.

FIG. 6 will be explained with reference to FIG. 7, which is a flowchart of an example process for first endpoint 110C to communicate with second endpoint 140C in private network 142 according to a third example. Example process 700 may include one or more operations, functions, or actions illustrated by one or more blocks, such as 710 to 730. The various blocks may be combined into fewer blocks, divided into additional blocks, and/or eliminated depending on the desired implementation.

Figure 7:
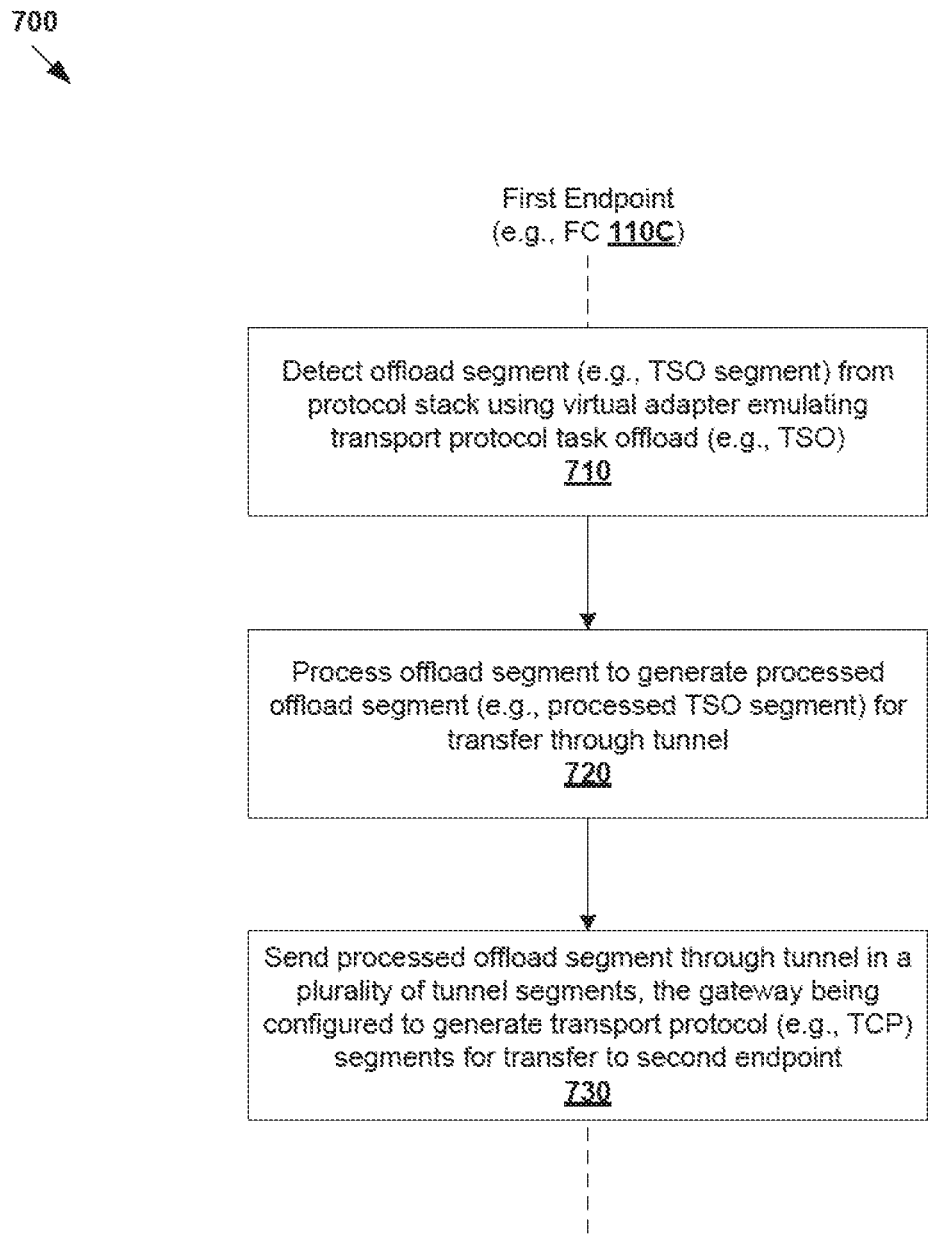
FIG. 7 is a flowchart of an example process for a first endpoint to communicate with a second endpoint in a private network according to a third example.

Referring first to 710 in FIG. 7, FC 110C detects a TSO segment (see 614 in FIG. 6) from application 112C executing on FC 110C using virtual adapter 119C that emulates TSO (i.e., example "transport protocol task offload"). The TSO segment is generated by protocol stack 116C from a chunk of data (see 610 and 612 in FIG. 6) that is detected from application 112C via socket 114C. The chunk of data is destined for SC 140C in private network 142. In one example, the TSO segment may be generated by encapsulating the chunk of data with an application-level TCP header identifying the destination IP address and destination port number associated with SC 140C.

At 720 in FIG. 7, virtual adapter 119C processes the TSO segment (see 614 in FIG. 6) to generate a processed TSO segment (i.e., example "processed offload segments") for transfer through tunnel 122C. At 730 in FIG. 7, virtual adapter 119C sends the processed TSO segment in SSL tunnel segments (see 616 in FIG. 6) through tunnel 122C. Gateway 130 is configured to perform segmentation to generate TCP segments (see 618 in FIG. 6) from the processed TSO segment (see 616 in FIG. 6) for transfer to destination SC 140C.

Using example process 700, bulk processing may be performed (e.g., by VPN client 118C) to process the TSO segment (see 616 in FIG. 6), which is larger than conventional TCP segments. This in turn allows more data to be sent through tunnel 122C compared to the conventional approach implemented by FA 110A in FIG. 7. The processing by virtual adapter 119C at 720 may include any suitable processing, such as compression, VPN header encapsulation, encryption, or any combination thereof, etc. In practice, compression of the larger TSO segment may be performed more effectively compared to that of smaller individual TCP segments.

More detailed examples will be explained with reference to FIG. 8 and FIG. 9. In particular, FIG. 8 is a flow diagram illustrating example communication 800 in network environment 600 in FIG. 6 when example process 700 in FIG. 7 is implemented. The example in FIG. 8 is illustrated using one or more operations, functions, or actions, such as 801 to 860. The various operations, functions, or actions may be combined, divided, and/or eliminated based upon the desired implementation. FIG. 9 is a schematic diagram illustrating example processing 900 by first endpoint 110C and gateway 130 when example process 700 in FIG. 7 is implemented.

At 801 and 805 in FIG. 8, in response to application 112C connecting to private network 142, VPN client 118C establishes tunnel 122C (e.g., SSL tunnel) with gateway 130. Any suitable approach may be used at 805, such as establishing a tunnel-level TCP connection for tunnel 122C. The tunnel-level TCP connection may be identified using a connection ID and subsequently used by FB 110C to communicate with any destination in private network 142, such as SC 140C. Similar to the examples in FIG. 3, a three-way handshake may be used. Also, although one application 112C is used as an example, it should be understood that multiple applications executing on FC 110C may share the same tunnel-level TCP connection with gateway 130.

At 810 in FIG. 8, application 112C opens socket 114C to send a chunk of data (see 610 in FIG. 6) for transfer to destination SC 140C in private network 142. The chunk of data sent by application 112C includes unsegmented data prior to any TCP processing. Socket system calls may be invoked by application 112C to open and send the chunk of data via socket 114C.

At 815 in FIG. 8, in response to detecting the chunk of data (see 612 in FIG. 6) from application 112C via socket 114C, protocol stack 116C establishes an application-level TCP connection with destination SC 140C in private network 142. Similar to the example in FIG. 3, a three-way handshake process may be used by protocol stack 116C.

At 820 in FIG. 8, protocol stack 116C generates a TSO segment (see 614 in FIG. 6) from the chunk of data detected from application 112C. The size of the TSO segment may be manually configured (e.g., by a network administrator) or negotiated between FC 110C and gateway 130 when tunnel 122C is established. For example, a TSO segment may have an application-level TCP header size=40 bytes and a maximum payload size=64 KB (i.e., 65,536 bytes). In this case, one TSO segment may be generated from a chunk of data with size=64 KB (i.e., 65,536 bytes). This should be contrasted with the conventional approach of FA 110A, which generates 45 TCP segments with maximum payload size=1,460 bytes.

At 825 in FIG. 8, protocol stack 116C sends the TSO segment (see 614 in FIG. 6) to virtual adapter 119C. For example, protocol stack 116C may perform transport protocol processing on the chunk of data (see 612 in FIG. 6). However, unlike the conventional approach implemented by FA 110A in FIG. 1 and FIG. 6, protocol stack 116C does not perform any segmentation on the chunk of data (see 612 in FIG. 6). Instead, the transport protocol task of segmentation is offloaded to gateway 130.

At 830 in FIG. 8, virtual adapter 119C emulates TSO to detect the TSO segment (see 614 in FIG. 6) generated by protocol stack 116C. At 835 in FIG. 8, virtual adapter 119C processes the TSO segment (see 614 in FIG. 6) to generate a processed TSO segment (see 616 in FIG. 6). Similar to the example in FIG. 3, any suitable processing may be performed at 835, such as compression, VPN header encapsulation, encryption, or any combination thereof, etc. As such, the term "processed" in "processed offload segment" may refer generally to an offload segment that is compressed, encapsulated with a VPN header, encrypted, or a combination thereof, etc.

Referring also to FIG. 9, the TSO segment (see 614 in FIG. 9) detected directly from protocol stack 116C may be processed (e.g., by VPN client 118C) using any suitable approach. For example, the TSO segment (see 614 in FIG. 9) may be compressed (see 910 in FIG. 9), encapsulated with a VPN header (see 920 and header labelled "V" in FIG. 9) and encrypted (see 930 in FIG. 9) to generate a processed TSO segment (see 935 in FIG. 9). The VPN header may identify the destination IP address and destination port number associated with SC 140C.

The processed TSO segment (see 614 in FIG. 9) is then sent through tunnel 122C to gateway 130 in tunnel segments, such as SSL tunnel segments (see 945 in FIG. 9). In practice, the processed TSO segment (see 614 in FIG. 9) may be encapsulated with an SSL header before it is segmented into multiple SSL tunnel segments (see 940). Each tunnel segment is encapsulated with a tunnel-level TCP header (labelled "S" in FIG. 9) identifying the destination IP address and destination port number associated with gateway 130.

In practice, FC 110C (e.g., VPN client 118C) may implement a compression unit to perform SSL compression with the aim of reducing the amount of data sent through tunnel 122C for improved throughput and efficiency. An encapsulation unit may be implemented to perform VPN header encapsulation. An encryption unit may be implemented to perform SSL encryption to support secure communication through tunnel 122C. Generation of SSL tunnel segments (see 940 in FIG. 9) may be performed by an SSL protocol stack (not shown for simplicity) implemented by FC 110C.

At 840 in FIG. 8, virtual adapter 119C sends the processed TSO segment in SSL tunnel segments (see 616 in FIG. 6) through tunnel 122C. Gateway 130 is configured to generate TCP segments (see 618 in FIG. 6) from the processed TSO segment for transfer to destination SC 110C. [0083] in more detail, at 845 in FIG. 8, gateway 130 receives the SSL tunnel segments containing the processed TSO segment (see 616 in FIG. 6) through tunnel 122C from virtual adapter 119C. At 850 and 855 in FIG. 8, gateway 130 generates TCP segments (see 618 in FIG. 6) from the processed TSO segment, and sends them to destination SC 140C.

Referring to FIG. 9 again, generating the TCP segments at 850 in FIG. 8 may involve reversing the processing by FC 110C at 835 in FIG. 8. For example, gateway 130 may first reassemble the SSL tunnel segments (see 945 and 950 in FIG. 9). For example, gateway 130 may perform decryption (see 960 in FIG. 9) using security information exchanged when tunnel 122C is established; decapsulation (see 970 in FIG. 9) to remove a VPN header; and decompression (see 980 in FIG. 9) to obtain the TSO segment. Gateway 130 may then perform TCP segmentation (see 990 in FIG. 9) to obtain multiple TCP segments (see 618 in FIG. 9). The output of gateway 130 may be TCP segments (see 618 in FIG. 9) with an application-level TCP header size=40 bytes and maximum payload size=1,460 bytes (i.e., 1500 bytes in total).

At 860 in FIG. 8, SC 140C receives the TCP segments (see 618 in FIG. 6 and FIG. 9) sent by gateway 130. Although not shown in FIG. 6 and FIG. 8, SC 140C may include a protocol stack to reassemble the received TCP segments into a chunk of data sent by application 112C of sender FC 110C.

In practice, any suitable TSO emulation approach may be used. TSO is also known as large send offload (LSO). For example, Windows operating system supports an NDIS 6.0 virtual adapter that may be configured to offload segmentation of large TSO segments from protocol stack 116C. Virtual adapter 119C may be configured to emulate TSO by installing one or more drivers on FC 110C according to any suitable TSO specification. Once the data transfer completes, connection termination may be initiated by protocol stack 116C or SC 110C, such as by sending a finish (FIN) packet.

Example LRO Emulation for Incoming Data

According to a fourth example, large receive offload (LRO) emulation may be implemented by a first endpoint (e.g., FC 110C) to increase inbound throughput, which is especially important for high-bandwidth applications. In more detail, FIG. 10 is a schematic diagram illustrating example network environment 1000 in which first endpoint 110C receives incoming data from second endpoint 140C in private network 142 according to a fourth example. It should be understood that network environment 1000 may include additional and/or alternative components than that shown, depending on the desired implementation.

In the following example, in addition to TSO emulation for outgoing data, first endpoint FC 110C in FIG. 6 may support LRO emulation for incoming data in FIG. 10. In this case, second endpoint SC 110C is the source, and first endpoint FC 110C the destination. For example, in response to receiving TCP segments (see 1020 in FIG. 10) destined for FC 110C from source SC 140C, gateway 130 generates a LRO segment (see 1022 in FIG. 10) from the TCP segments.

For example, an LRO segment may be generated by aggregating the payload of multiple TCP segments. The LRO segment (e.g., 64 KB) may include an application-level TCP header but is larger than a conventional TCP segment (e.g., 1,500 bytes). The size of an LRO segment may be manually configured (e.g., by a network administrator) or negotiated between gateway 130 and FC 110C when tunnel 122C is established. Gateway 130 may then generate a processed LRO segment from the LRO segment, such as by performing compression, VPN header encapsulation, encryption, any combination thereof, etc. Here, the term "processed" in "processed LRO segment" may refer generally to compressed, encapsulated, en from a chunk of data with size=64 KB (i.e., 65,536 bytes), crypted, or any combination thereof, etc.

The processed LRO segment is then sent in SSL tunnel segments through tunnel 122C to FC 110C. In practice, each SSL tunnel segment includes a tunnel-level TOP header and SSL header. At FC 110C, the SSL tunnel segments (see 1024) may be reassembled (e.g., by SSL protocol stack) into the processed LRO segment. Virtual adapter 119C supported by FC 110C may emulate LRO to detect the processed LRO segment. VPN client 118C then generates a LRO segment (see 1024 in FIG. 10) from the processed LRO segment (see 1022 in FIG. 10). Any suitable processing may be performed, such as decompression, decapsulation to remove a VPN header, decryption, etc. In practice, FC 110C (e.g., VPN client 118C) may include a decompression unit, a decapsulation unit and a decryption unit to perform the above processing.

Next, instead of sending conventional TOP segments, virtual adapter 119C sends the LRO segment (see 1024 in FIG. 10) to protocol stack 116C that supports LRO. In response, protocol stack 116C generate a chunk of data (see 1026 and 1028 in FIG. 10) from the LRO segment for transfer to application 112C via socket 114C. As such, compared to the first example implemented by FB 110B in FIG. 4, protocol stack 116C is not completely bypassed. However, compared to the conventional approach implemented by FA 110A in FIG. 4, protocol stack 116C is relieved from processing a large number of smaller TCP segments.

The chunk of data (see 1026 and 1028 in FIG. 10) may be generated from the larger processed LRO segment (see 1024 in FIG. 10) more efficiently to improve application performance. Again, this is especially important when a large amount of data is transferred from source SC 140C to destination FC 110C. In practice, any suitable LRO emulation approach may be used. Virtual adapter 1110C may be configured to emulate LRO by installing one or more drivers on FC 110C according to any suitable LRO specification. The reverse of example processing 900 in FIG. 9 also may also be applied for handling incoming data from SC 140C.

In the above examples, any suitable approach may be used to improve the performance of gateway 130. For example, since TCP processing is offloaded to gateway 130 in the case of TOE and TCP segmentation in the case of TSO, gateway 130 may in turn offload at least some of the processing to a physical NIC to reduce CPU usage. In this case, the physical NIC on gateway 130 will have to be able to support TOE or TSO.

The above examples can be implemented by hardware (including hardware logic circuitry), software or firmware or a combination thereof. The above examples may be implemented by any suitable network device, endpoint device, computer system, etc., which may include processor and memory that may communicate with each other via a bus, etc. The network device may include a non-transitory computer-readable medium having stored thereon instructions that, when executed by the processor, cause the processor to perform processes described herein with reference to FIG. 1 to FIG. 10.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PFD1), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a first endpoint to communicate with a second endpoint over a public network, the second endpoint being in a private network, the method comprising:
   detecting a chunk of data directly from an application executing on the first endpoint, wherein the first endpoint is a computing device operated at a location remote to the private network, wherein the chunk of data is destined for the second endpoint and detected using a virtual adapter that emulates a transport protocol task offload to bypass Transmission Control Protocol (TCP) processing by a protocol stack of the first endpoint, wherein the transport protocol task offload is a TCP offload engine (TOE);
   processing the chunk of data, by the virtual adapter, to generate a chunk of processed data; and
   sending the chunk of processed data in a plurality of tunnel segments to a gateway in the private network through a tunnel connecting the virtual adapter and the gateway, wherein the tunnel is established between the first endpoint and the gateway over the public network, and wherein the gateway is configured to perform TCP processing to generate a plurality of transport protocol segments from the chunk of processed data for transfer to the second endpoint.

2. The method of claim 1, wherein detecting the chunk of data comprises:
   emulating, by the virtual adapter, the TCP offload engine to detect the chunk of data directly from the application to bypass TCP processing by the protocol stack, thereby offloading TCP processing of the chunk of data to the gateway.

3. The method of claim 1, wherein the sending the chunk of processed data comprises:
   sending the chunk of processed data through the tunnel in the plurality of tunnel segments, wherein the gateway is configured to establish a connection with the second endpoint and to send the plurality of transport protocol segments via the connection.

4. The method of claim 1, wherein the processing the chunk of data comprises:
   performing, by a private network client of the first endpoint, one or more of the following on the chunk of data: compression, encapsulation with a header associated with the private network and encryption.

5. The method of claim 1, wherein the method further comprises:
   detecting an incoming chunk of processed data from the gateway through the tunnel, wherein the incoming chunk of processed data is detected using the virtual adapter emulating the transport protocol task offload and the incoming chunk of processed data is generated by the gateway from a plurality of transport protocol segments from the second endpoint;
   processing the incoming chunk of processed data to obtain an incoming chunk of data; and
   sending the incoming chunk of data directly to the application, wherein the incoming chunk of data bypasses TCP processing by the protocol stack.

6. The method of claim 5, wherein:
   the gateway is configured to perform one or more of the following to generate the incoming chunk of processed data: compression, encapsulation of a header associated with the private network and encryption; and
   the processing the incoming chunk of data comprises performing, by a private network client of the first endpoint, one or more of the following on the incoming chunk of processed data: decompression, decapsulation of the header associated with the private network and decryption.

7. The method of claim 1, wherein the tunnel is a secure socket layer (SSL) tunnel, the plurality of tunnel segments are SSL tunnel segments and the private network is a virtual private network (VPN).

8. A non-transitory computer-readable storage medium that includes a set of instructions which, in response to execution by a processor of a first endpoint, cause the processor to communicate with a second endpoint over a public network, the second endpoint being in a private network, the method comprising:
   detecting a chunk of data directly from an application executing on the first endpoint, wherein the first endpoint is a computing device operated at a location remote to the private network, wherein the chunk of data is destined for the second endpoint and detected using a virtual adapter that emulates a transport protocol task offload to bypass Transmission Control Protocol (TCP) processing by a protocol stack of the first endpoint, wherein the transport protocol task offload is a TCP offload engine (TOE);
   processing the chunk of data, by the virtual adapter, to generate a chunk of processed data; and
   sending the chunk of processed data in a plurality of tunnel segments to a gateway in the private network through a tunnel connecting the virtual adapter and the gateway, wherein the tunnel is established between the first endpoint and the gateway over the public network, and wherein the gateway is configured to perform TCP processing to generate a plurality of transport protocol segments from the chunk of processed data for transfer to the second endpoint.

9. The non-transitory computer-readable storage medium of claim 8, wherein detecting the chunk of data comprises:
   emulating, by the virtual adapter, the TCP offload engine to detect the chunk of data directly from the application to bypass TCP processing by the protocol stack, thereby offloading TCP processing of the chunk of data to the gateway.

10. The non-transitory computer-readable storage medium of claim 9, wherein the sending the chunk of processed data comprises:
    sending the chunk of processed data through the tunnel in the plurality of tunnel segments, wherein the gateway is configured to establish a connection with the second endpoint and to send the plurality of transport protocol segments via the connection.

11. The non-transitory computer-readable storage medium of claim 8, wherein the processing the chunk of data comprises:
    performing, by a private network client of the first endpoint, one or more of the following on the chunk of data: compression, encapsulation with a header associated with the private network and encryption.

12. The non-transitory computer-readable storage medium of claim 8, wherein the method further comprises:
  detecting an incoming chunk of processed data from the gateway through the tunnel, wherein the incoming chunk of processed data is detected using the virtual adapter emulating the transport protocol task offload and the incoming chunk of processed data is generated by the gateway from a plurality of transport protocol segments from the second endpoint;
  processing the incoming chunk of processed data to obtain an incoming chunk of data; and
  sending the incoming chunk of data directly to the application, wherein the incoming chunk of data bypasses TCP processing by the protocol stack.

13. The non-transitory computer-readable storage medium of claim 12, wherein:
  the gateway is configured, to perform one or more of the following to generate the incoming chunk of processed data: compression, encapsulation of a header associated with the private network and encryption; and
  the processing the incoming chunk of data comprises performing, by a private network client of the first endpoint, one or more of the following on the incoming chunk of processed data: decompression, decapsulation of the header associated with the private network and decryption.

14. The non-transitory computer-readable storage medium of claim 8, wherein the tunnel is a secure socket layer (SSL) tunnel, the plurality of tunnel segments are SSL tunnel segments and the private network is a virtual private network (VPN).

15. An endpoint, being a first endpoint, configured to communicate with a second endpoint over a public network, the second endpoint being in a private network, comprising:
  a processor; and
  a non-transitory computer-readable medium having stored thereon instructions that, when executed by the processor, cause the processor to support an application, a protocol stack and a virtual adapter and to:
    detect a chunk of data directly from the application executing on the first endpoint, wherein the first endpoint is a computing device operated at a location remote to the private network, wherein the chunk of data is destined for the second endpoint and detected using the virtual adapter that emulates a transport protocol task offload to bypass Transmission Control Protocol (TCP) processing by the protocol stack of the first endpoint, wherein the transport protocol task offload is a TCP offload engine (TOE);
    process the chunk of data, by the virtual adapter, to generate a chunk of processed data; and
    send the chunk of processed data in a plurality of tunnel segments to a gateway in the private network through a tunnel connecting the virtual adapter and the gateway, wherein the tunnel is established between the first endpoint and the gateway over the public network, and wherein the gateway is configured to perform TCP processing to generate a plurality of transport protocol segments from the chunk of processed data for transfer to the second endpoint.

16. The endpoint of claim 15, wherein the instructions for detecting the chunk of data cause the processor to:
  emulate, by the virtual adapter, the TCP offload engine to detect the chunk of data directly from the application to bypass TCP processing by the protocol stack, thereby offloading TCP processing of the chunk of data to the gateway.

17. The endpoint of claim 16, wherein the instructions for sending the chunk of processed data cause the processor to:
  send the chunk of processed data through the tunnel in the plurality of tunnel segments, wherein the gateway is configured to establish a connection with the second endpoint and to send the plurality of transport protocol segments via the connection.

18. The endpoint of claim 15, wherein the instructions for processing the chunk of data cause the processor to:
  perform, by a private network client of the first endpoint, one or more of the following on chunk of data: compression, encapsulation with a header associated with the private network and encryption.

19. The endpoint of claim 15, wherein the instructions cause the processor to:
  detect an incoming chunk of processed data from the gateway through the tunnel, wherein the incoming chunk of processed data is detected using the virtual adapter emulating the transport protocol task offload and the incoming chunk of processed data is generated by the gateway from a plurality of transport protocol segments from the second endpoint;
  process the incoming chunk of processed data to obtain an incoming chunk of data; and
  send the incoming chunk of data directly to the application, wherein the incoming chunk of data bypasses TCP processing by the protocol stack.

20. The endpoint of claim 19, wherein:
  the gateway is configured to perform one or more of the following to generate the incoming chunk of processed data: compression, encapsulation of a header associated with the private network and encryption; and
  the instructions for processing the incoming chunk of processed data cause the processor to perform, by a private network client of the first endpoint, one or more of the following on the incoming chunk of processed data: decompression, decapsulation of the header associated with the private network and decryption.

21. The endpoint of claim 15, wherein the tunnel is a secure socket layer (SSL) tunnel, the plurality of tunnel segments are SSL tunnel segments and the private network is a virtual private network (VPN).

* * * * *